Feb. 7, 1961 C. G. GROSS 2,970,395
VIEWER
Filed Jan. 18, 1956 5 Sheets-Sheet 1

INVENTOR
Carl G. Gross
BY
Norman Holland
ATTORNEY

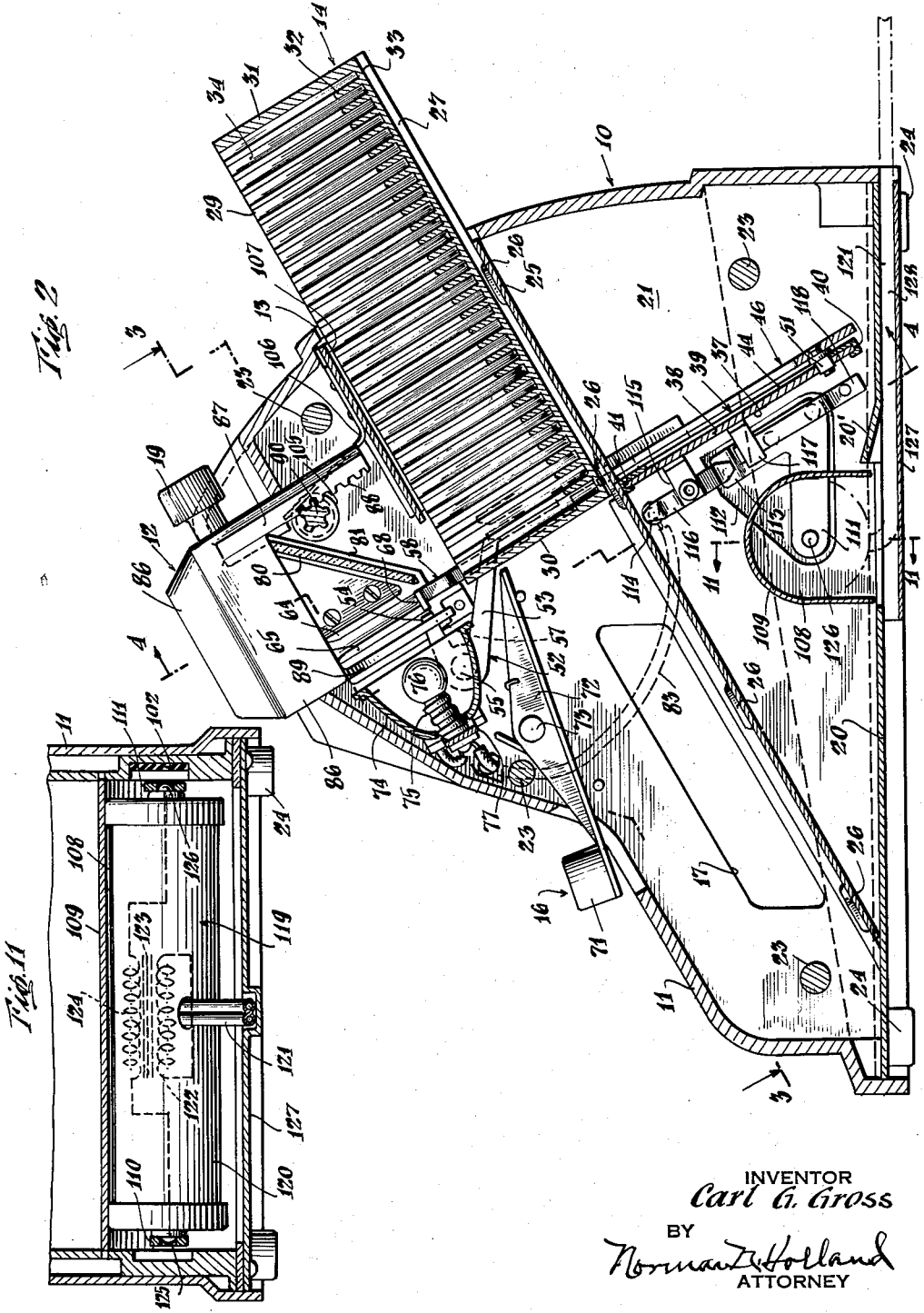

Feb. 7, 1961 C. G. GROSS 2,970,395
VIEWER
Filed Jan. 18, 1956 5 Sheets-Sheet 3
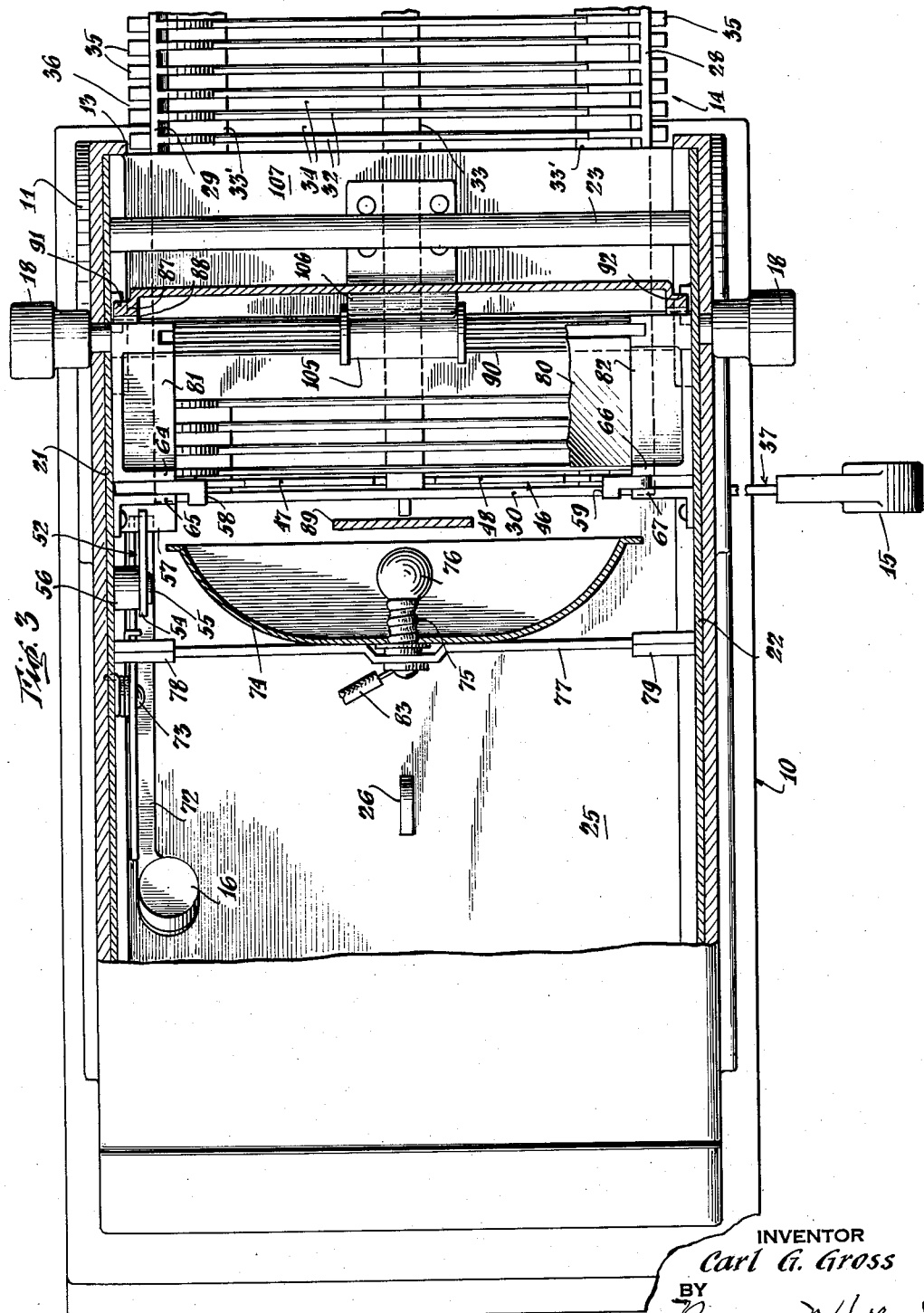
INVENTOR
Carl G. Gross
BY
Norman N. Holland
ATTORNEY Feb. 7, 1961 C. G. GROSS 2,970,395
VIEWER
Filed Jan. 18, 1956 5 Sheets-Sheet 4
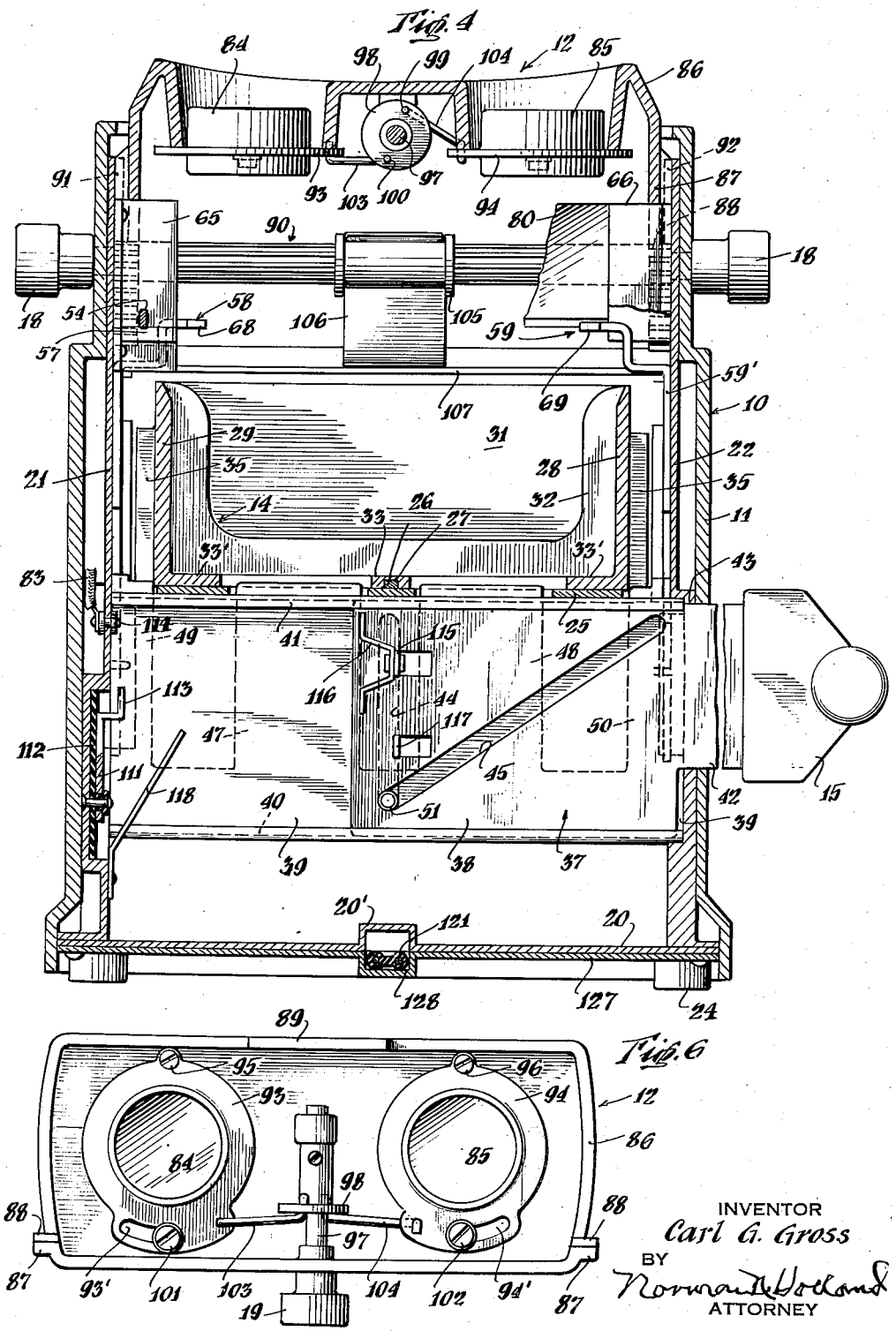
INVENTOR
Carl G. Gross
BY
ATTORNEY

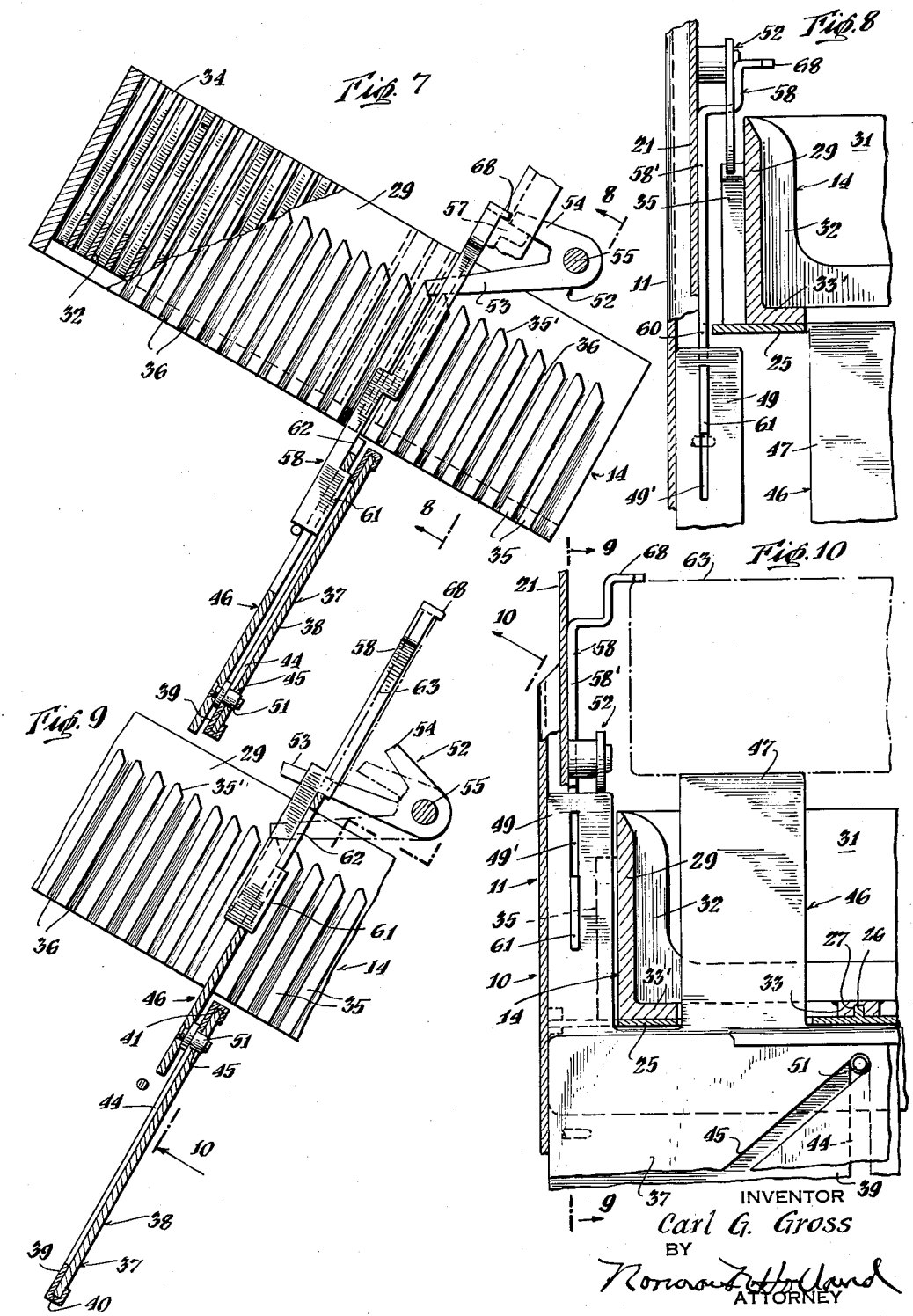

United States Patent Office 2,970,395
Patented Feb. 7, 1961

2,970,395

VIEWER

Carl G. Gross, Mount Vernon, N.Y., assignor to Airequipt Manufacturing Co., Inc., New Rochelle, N.Y., a corporation of New York Filed Jan. 18, 1956, Ser. No. 559,892

5 Claims. (Cl. 40—79)

This invention relates to apparatus for viewing images such as those formed on positive transparencies and the like, and more specifically to an improved viewer readily applicable to the display of both two and three dimensional images.

Viewers for displaying images on transparent slides both stereoscopically as well as in two dimensions have been proposed. Certain of these prior structures merely include provision for inserting one slide or a stereoscopic pair of slides at a time into the viewer. Others provide for automatic or semi-automatic operation utilizing a magazine containing a number of slides or sets of slides that are fed successively to a viewing position by manual operation of suitable feeding means. Known automatic or semi-automatic devices and particularly those arranged for magazine operation have been relatively complicated and expensive and have not afforded entirely satisfactory and dependable operation.

Accordingly, one object of the invention resides in the provision of a novel and improved magazine type viewer that not only overcomes the disadvantages of prior structures but provides a portable device that may be used for directly viewing transparencies both singly or in stereoscopic pairs that is characterized by its simplicity, dependability and relatively low cost.

Another object of the invetnion is an improved magazine and feeding means for slide type viewers that may be loaded quickly and easily, affords a positive, foolproof slide feed for moving each slide or set of slides from the magazine to the viewing position and returning them to the magazine and, in addition, includes means for facilitating rapid selection of a specific slide or slides in a magazine.

Still another object of the invention resides in the provision of an improved magazine type viewer for use with both self-contained batteries as well as an external source of power for illuminating the images to be viewed and wherein the illuminating means is coordinated with the feeding means so that illumination is provided only when a slide or slides are in the viewing position. This procedure not only lengthens the life of the batteries, but also lengthens the useful life of the lamp whether operated by the self-contained battery source or an external power supply.

A further object of the invention resides in the provision of an improved viewer for images on transparent slides embodying an improved optical system which together with means for feeding the slides into the optical system provides a dependable system affording a high degree of clarity together with ease of adjustment of the system for optimum results.

A still further object of the invention resides in the provision of an improved optical system particularly useful for stereoscopically viewing pairs of slides that may be easily and quickly adjusted to obtain clear images accurately aligned with the eyes of the viewer.

A still further object of the invention is the provision of an improved viewer having means for feeding slides successively from a magazine into the optical system and returning them to the magazine that utilizes a minimum number of parts and provides positive support of each slide in its movement into the optical system and return to the magazine.

A still further object of the invention resides in the provision of an improved viewer for photographic slides.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 2 is a longitudinal cross sectional view of the apparatus shown in Fig. 1 with the adjustable eyepiece in side elevation;

Fig. 3 is a cross sectional view of Fig. 2 taken along the line 3—3 thereof;

Fig. 4 is a cross sectional view of Fig. 2 taken along the line 4—4 thereof;

Fig. 6 is a bottom view of the eyepiece of the viewer to illustrate the adjustment of the lenses for stereoscopic viewing;

Fig. 7 is a side elevation in partial section of a magazine in accordance with the invention and its cooperation with certain elements of the feeding means for transporting slides from the magazine into the viewing position;

Fig. 8 is a partial cross sectional view of Fig. 7 taken along the line 8—8 thereof;

Fig. 9 is a side elevational view in partial section taken along the line 9—9 of Fig. 10 and corresponding to Fig. 7 showing the position of certain elements of the feeding mechanism when a slide is in the raised or viewing position;

Fig. 10 is a cross sectional view of Fig. 9 taken along the line 10—10 thereof; and Fig. 11 is a cross sectional view of Fig. 2 taken along the line 11—11 thereof showing the battery compartment and means within said compartment for coupling the viewer to an external power source.

Figure 1:
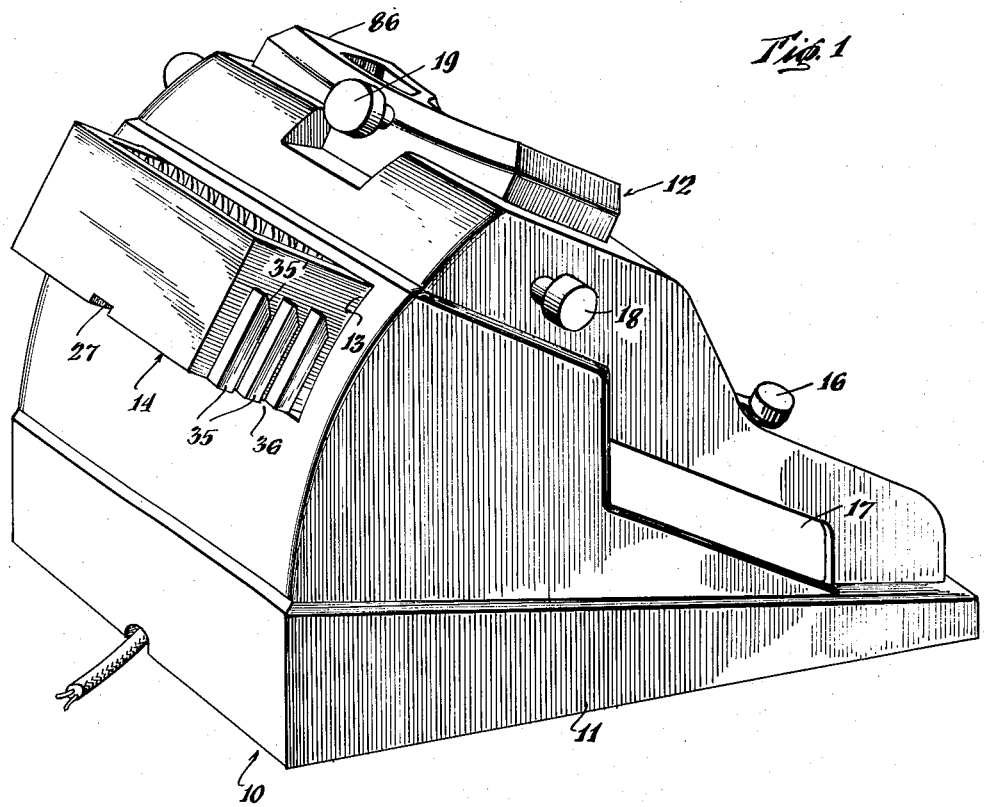
Fig. 1 is a perspective view of one embodiment of a viewer in accordance with the invention.

The viewer in accordance with the invention and illustrated in Fig. 1 is essentially a portable device that may be operated either from self-contained batteries or an external power supply. It will become apparent, however, as the description proceeds that certain features of this invention are equally applicable to other types of viewing apparatus.

The viewer denoted generally by the numeral 10 in Fig. 1 includes an outer casing 11, a dual eyepiece 12 for viewing stereoscopic slides and an opening 13 in the rear wall of the casing for receiving a magazine 14 containing a plurality of slides to be viewed. The magazine when inserted in the opening 13 is in an inclined position and feeds downwardly past the eyepiece 12 under the action of gravity. The operating handle 15 (see Figs. 3 and 4) together with the feeding mechanism as will be described locks the magazine 14 in position within the opening 13 and permits its advancement one notch or slide compartment at a time as the operating handle 15 is moved inwardly and outwardly of the viewer for transporting a slide into the optical system and then returning it to the magazine 14. Means are also provided on the viewer in the form of a push button 16 that will permit transportation of the magazine 14 downwardly beneath the eyepiece 12 without actuation of the operating handle 15 so that selected slides may be viewed out of consecutive order in the magazine without the necessity of operating the handle 15 in order to advance the magazine 14 to the desired position. Removal of the magazine 14, when it is disposed wholly within the viewer, is facilitated by means of a pair of openings 17 disposed on the sides of the viewer 10. As the magazine 14 advances downwardly into the apparatus the front of the magazine will become visible through the slots 17. When all the slides in the magazine have been displayed, the magazine will be wholly within the viewer 10 and can then be removed by manually engaging it through the slot 17 and moving it rearwardly until it extends from the housing 11 whereupon it may be readily withdrawn.

In addition to the magazine control, the eyepiece 12 is provided with two adjustments, a focusing adjustment 18 disposed on the side of the apparatus for moving the eyepiece into and out of the housing 11 and a width control 19 for displacing the eyepiece lenses one relative to the other to coordinate the distance between the lenses with the interpupilary distance of the person using the viewer.

The structural details of the viewer thus far described are shown in Figs. 2, 3 and 4. The several elements forming part of the feeding means and optical system are supported by a basic frame structure comprising a pair of side walls 21 and 22 that may be fabricated of metal, plastic or other suitable material held in spaced relationship by four transverse members 23. The bottom member 20 forms in effect a bottom cover plate and includes rubber feet 24 for supporting the viewer and preventing it from scratching surface upon which it may be rested.

The magazine 14 when inserted in the opening 13 of the viewer is carried by an inclined plate or track 25 extending between the side members 21 and 22 and held in place by inclined channels formed in the side members. The top face of the inclined plate 25 is aligned with the bottom edge of the opening 13 and the center of the plate is provided with a series of spaced elongated guiding members 26 that engage a channel 27 in the underside of the magazine 14 to maintain the magazine centrally located within the viewer as it is moved downwardly by the action of the feeding means. It will be observed that the guides 26 are spaced sufficiently close together so that two guides at all times engage the channel 27 in the magazine 14. If desired, one continuous guide 26 may, of course, be used in place of a plurality of independent guides as illustrated.

The magazine 14 which may be fabricated of plastic, metal or other suitable material is rectangularly shaped and holds a plurality of stereoscopic pairs of slides used for viewing images in three dimensions. It includes a pair of side walls 28 and 29 and front and rear walls 30 and 31 respectively. The slides to be contained within the magazine are held in spaced relationship by a series of U-shaped ribs 32 with the legs or upright portions of the ribs formed integrally with the side walls 28 and 29. The channel 27 on the magazine is formed in a centrally disposed strip 33 attached to the front and rear walls 30 and 31 and to each of the transverse members of the ribs 32. In addition, the magazine includes a pair of side strips 33' attached to the walls and ribs 32. Thus, the bottom of the magazine is entirely open except for the transverse parts of the ribs 32 and the longitudinal members 33 and 33' so that a suitable feeding device may be moved through the intervening openings 34 between adjoining ribs 32 to move a slide from its position in the magazine upwardly into position in the optical system as will be described.

The side walls 28 and 29 of the magazine 14 are preferably provided with a series of spaced elongated ratchet members 35 extending from the bottom edge of the magazine to a point spaced from the top thereof, though it is apparent that these ratchets may be included on only one side wall. Each member 35 is aligned with a compartment of the magazine and has a forwardly inclined upper edge 35' which cooperates with a pawl member for advancing the magazine in the viewer to exhibit the slides successively. In addition, the spaces 36 between the members 35 cooperate with locking members to prevent displacement of the magazine during the time a slide is exhibited. In this way, the magazine cannot be transported manually or otherwise moved within the machine until the slide being viewed is returned to its position in the magazine.

Figure 5:
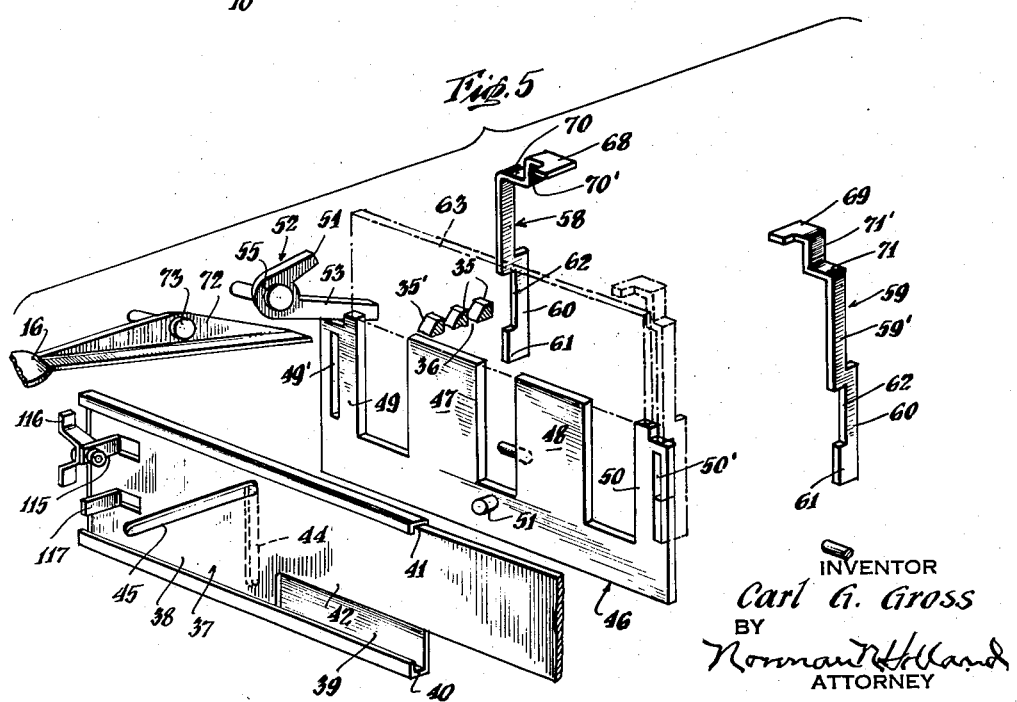
Fig. 5 is an exploded perspective view of the semiautomatic means for transporting slides from the magazine into a viewing position and returning them to the magazine.

The semi-automatic feed for moving a film slide from the magazine upwardly into the optical system is actuated by the handle 15 that is attached to a slidable actuating member 37 mounted for transverse reciprocation. This member includes an enlarged rectangular section 38 slidably mounted on a transverse plate 39 having upper and lower grooves 40 and 41 for receiving and holding the member 38. The plate further includes a narrow actuating member 42 carrying the operating handle 15 and formed integrally with the rectangular plate 38. The member 42 extends outwardly through an opening 43 in the wall 22 of the frame and a cooperating opening in the outer housing 11. The plate 39 which slidably supports the actuating member 37 has a vertically disposed slot 44 extending substantially throughout the height thereof and centered between the side members 21 and 22 of the frame. The manually operated feed actuating member 37 includes a diagonally disposed slot 45 that inclines upwardly to the right as shown in Fig. 4. When the actuating member is moved to the right as shown in Fig. 4, the lower end of the slot 45 is in approximate alignment with the lower end of the slot 44 and when the slide 37 is moved to the left as shown in Fig. 5, the upper end of the inclined slot 45 will be in substantial alignment with the upper end of the slot 44.

The back side of the transverse plate 39 forming part of the film feeding means is provided with a film elevator 46 slidably mounted for vertical reciprocation in grooves formed in the side walls 21 and 22. This member includes a pair of upwardly extending feeding members 47 and 48 adapted to move through the openings 34 of the magazine when elevated and a pair of magazines locking members 49 and 50. A pin 51 is fixed to the elevator 46 and extends through both slots 44 and 45 previously described. With this arrangement and with the manually operated actuating member 37 moved to the right as shown in Fig. 4, the pin 51 is in the lowermost position. As the actuator 37 is moved to the left, the cooperation of the vertical slot 44 in the transverse member 39 and the inclined slot 45 in the actuating member 37 moves the pin 51 upwardly until it reaches the upper end of the slot 44. This moves the elevator upwardly and the feeding members 47 and 48 move upwardly through the openings 34 in the magazine 14 to engage and elevate a film slide 63 into the optical system.

The locking members 49 and 50 of the elevator 46 in addition to assisting in the guidance of the elevator during its vertical movement as previously described function to engage the channels 36 between the elongated ratchet members 35 disposed on each side of the magazine 13. In this way, when the elevator is raised the magazine is locked firmly in position and cannot be moved in either one direction or the other until the elevator 46 is completely lowered. This also prevents any possibility of damaging or jamming the magazine while the elevating members 47 and 48 extend upwardly through the openings 34 between the adjoining ribs 32.

Advancement of the magazine one slide compartment at a time is accomplished by a pawl 52 having a lower elongated leg 53 and an upper shorter leg 54. The pawl 52 is pivoted to the wall 21 by a suitable pin 55 and is spaced from the wall by an intervening collar 56. The lower leg 53 of the pawl tends to move the pawl in a clockwise direction as viewed in Fig. 2 under the influence of gravity and the clockwise motion is limited by the engagement of the upper leg 54 with a stop 57. When the leg 53 is in the lowermost position it engages the leading edge 35' of the forwardmost ratchet member 35 upon insertion of a magazine in the viewer. When the handle 15 of the feeding means is moved inwardly to displace the elevator 46 upwardly the top edge of the elevator locking member 49 engages the leg 53 of the pawl and moves it upwardly out of engagement with the cam surface 35'. In so doing the magazine 14 is permitted to move forwardly a minute distance until locking members 49 and 50 engage ratchet members 35. This distance is sufficient to prevent the end of the leg 53 from reengaging the sloping edge 35' of the same ratchet member 35. Thus as soon as the elevator 46 moves to the downward-most position and returns the elevated slide 63 to its place in the magazine, the magazine will move forwardly under the influence of gravity until the end of the leg 53 engages the next successive ratchet member 35. Thus each time a slide has been displayed and returned to the magazine by reciprocation of the actuating handle 15 the magazine will be advanced one compartment so that upon actuation of the handle 15 the next successive slide will be displayed.

Under normal circumstances the film slide, upon displacement upwardly into the optical system by the elevator 46, will normally return to its compartment when the elevator is lowered by the action of gravity alone. However, should the slide be slightly warped or should it be thicker than a conventional slide a pair of guides 58 and 59 carried by the elevator 46 positively return the slide to the magazine upon withdrawal of the operating handle 15. These members, more clearly observable in Fig. 5, each include a bottom section 60 of U-shaped configuration with the lower leg 61 of each member slidably engaging elongated slots 49' and 50' in the members 49 and 50 of the elevator 46. The recessed portion 62 of each member 58 and 59 is coordinated with its respective slot 49'—50' so that upon raising the elevator 46 the members 58 and 59 will be raised slightly in advance of the film slide as shown in Fig. 5. The film slide is illustrated in this figure in dotted outline and is denoted by the numeral 63. The members 58 and 59 are guided in their vertical movement partially by engagement of the lower legs 61 of the U-shaped sections 60 with their respective slots 49' and 50' as described above and in part by fixed slide guiding members 64 and 65 secured to the wall 21 and 66 and 67 secured to the wall 22. With this arrangement the body parts 58' and 59' of the members 58 and 59 ride well within the film guides 64—65 and 66—67. The upper ends of the body parts 58'—59' carry outwardly extending tabs 68 and 69. The tab 68 is connected to the body part 58' of the member 58 by an L-shaped section 70 with the vertical leg of this section acting as a side guide for one side of the film slide 53. The other member 59 is similarly arranged with an L-shaped section 71 so that its vertical leg 71' forms the other side guide for the slide to maintain it centrally within the viewer when in the raised position.

With the foregoing arrangement, as the slide is moved upwardly under the action of the elevator 46 the tabs 68 and 69 of the guiding members 58 and 59 move upwardly slightly in advance of the slide but with the portions 70' and 71' maintaining the film centrally of the viewer. When the slide is in the fully raised position it is held snugly between the top edge of the elevator 46 and the tabs 68 and 69. As the elevator 46 is retracted it moves downwardly slightly in advance of the side or guiding members 58 and 59. Should the film slide 63 fail to move freely under the action of gravity it will tend to hold the side guiding members 58 and 59 in an upper position. In so doing, the legs 61 of these guiding members will engage the upper ends of the slots 49' and 50' of the elevator 46, whereupon the guides will be forceably drawn downwardly by the downward movement of the elevator 46 until the slide 63 is returned to its compartment in the magazine. In this way, positive elevation and retraction of the film slide is obtained and at the same time the slide is accurately centered in the apparatus so that a clear, well defined image can be viewed.

Under certain conditions, it may be desirable to advance the magazine without actually operating the feeding mechanism. For this purpose a lever 72 is provided that is pivoted to the wall 21 by a pin 73. The front end of this lever carries the operating button 16 as previously described while the rear end of the lever extends beneath the leg 53 of the pawl 52. When the button 16 is depressed the leg 53 of the pawl 52 is moved upwardly out of engagement with the ratchet members 35 on the side of the magazine 14 which then permits the magazine to slide freely in the viewer and be positioned for the display of any particular film slide within the magazine. The position of the magazine for the display of a particular film slide can be adjusted by manually controlling the movement of the magazine 14 through the openings 17 in the outer case 11 and corresponding openings 17' in the side walls 21 and 22 as illustrated.

The optical system for viewing the slides 63 comprises a source of illumination including an elongated reflector 74, a socket 75 mounted centrally of the reflector and a suitable lamp 76 adapted to be supported by the socket. The reflector and socket assembly is supported by a transverse bracket member 77 attached to the side walls 21 and 22 by suitable posts 78 and 79 as shown more clearly in Fig. 3 of the drawings. This reflector and lamp assembly is disposed on the front side of the film guides 64 to 67 inclusive. On the opposing side of a film slide when in position for viewing there is disposed a mirror 80 set at an angle of approximately 45 degrees with respect to the inclination of the magazine 14 when it is inserted in the viewer. This mirror 80 is supported by side members 81 and 82 which preferably are formed integrally with the film guiding means 64 and 66 respectively. In this way, the mirror 80 is always in exact alignment with the film being viewed.

Energy is supplied to the lamp by means of an insulated conductor 83 forming one lead and a ground return through the frame of the viewer. The operation of this electric circuit will be described more completely in connection with the battery compartment and the switch means coordinated with the feeding apparatus to turn the lamp on when a slide is in position to be viewed.

The optical system in the illustrated embodiment of the invention further includes an eyepiece 12 having a pair of lenses 84 and 85 mounted within an elongated housing or frame 86 of Bakelite or other suitable material. One side of the housing 86 is provided with a downwardly extending wall 87 having racks 88 secured to the ends thereof. The other side of the eyepiece frame 86 includes a downwardly extending member 89 that moves directly in front of the lamp 76 when the eyepiece 12 is in position to view a slide. This prevents direct observation of the lamp 76 and at the same time may include a white reflecting surface to increase the efficiency of the system.

The eyepiece 12 is moved inwardly and outwardly of the viewer by a pinion shaft 90 extending through and rotatably supported by the side walls 21 and 22 and carrying a knob 18 on each end thereof as may be viewed more clearly in Fig. 4. The side walls 21 and 22 also include grooves 91 and 92 for guiding the eyepiece inwardly and outwardly of the viewer in response to rotation of the pinion shaft 90 in engagement with the rack teeth 88 on each side of the rear wall 87 of the eyepiece. Thus, rotation of the pinion shaft by knobs 18 will function to focus the system to suit the needs of the individual.

In order to compensate for differences in the inter-pupilary distances of various individuals the lenses 84 and 85 are provided with substantially circular mounts 93 and 94 respectively. These mounts are pivoted to the frame 95 and 96 and the lens receiving openings in the frame 86 are elongated to allow a substantial degree of movement of the lenses 84 and 85 toward and away from each other. Simultaneous movement of the lenses 84 and 85 to increase or decrease their spacing is accomplished by a centrally disposed shaft 97 operated by the knob 19 and carrying a circular member 98 having a pair of oppositely disposed openings 99 and 100. The bottom side of the lens mounts 93 and 94 as viewed in Fig. 6 are provided with elongated slots 93' and 94' respectively for reception of mounting screws 101 and 102. The lens mount 93 is coupled to the rotary member 98 by means of a link 103 connected at one end to the frame 93 and at the other end to the opening 100. The lens mount 94 is coupled by means of a link 104 connected one end to the mount 94 and the other end to the opening 99 in the member 98. With this arrangement as the knob 19 is rotated in one direction the lenses 84 and 85 will be pulled inwardly while rotation of the knob 19 in the other direction will move the lenses outwardly to increase the inter-pupilary distance.

In order to hold the eyepiece 12 in position when once adjusted by the pinion shaft 90, the latter is provided with a centrally disposed collar or spool 105 engaging the teeth of the pinion shaft. A spring member 106 carried by a plate 107 mounted between the side walls 21 and 22 bears firmly against the spool 105 and provides sufficient friction to prevent the eyepiece 12 from being displaced by reason of vibration and yet permit it to be moved readily by the rotation of the knobs. 18.

Beneath the inclined plate 25 supporting the magazine 14 there is disposed the battery compartment 108 that extends between the side walls 21 and 22. One end of the battery compartment that is defined by a generally U-shaped housing 109 is provided with a spring contact 110 (Fig. 11) connected to the frame of the viewer and forming one circuit to the lamp 76. The other side of the battery compartment includes an insulated spring contact 111 mounted on an insulating member 112 carried by the wall 21 and having a raised contact member 113. The wire 83 from the lamp 76 is connected to a contact button 114 supported on the wall 21 in the vicinity of the battery contact member 113. The manually operated slide feeding member 37 as previously described carries an outwardly extending tab 115 as may be viewed more clearly in Fig. 4 and this tab carries a U-shaped contact member 116 of spring material. The member 116 is insulated from the tab 115 and functions to bridge contact members 113 and 114 when the knob 15 of the actuator 37 is moved to the left as viewed in Fig. 4. This completes the battery circuit and illuminates the lamp 76. At the same time the actuator carries a second tab 117 that contacts a spring 118 secured to the wall 21 as illustrated in Fig. 4. Spring 118 moves the actuator 37 to the right (Fig. 4) when the operator releases handle 15 to thereby open contacts 113, 114 to prevent accidental discharge of the batteries.

The power supply may consist of a suitable battery or batteries such as conventional flashlight cells or the like. In order to operate this device from 110 volts or another suitable power source a battery-like transformer 119 is provided and illustrated in Fig. 11. This transformer 119 has a cylindrical housing 120 of the diameter and length of two conventional flashlight batteries. A line cord 121 connects with the primary winding 122 of a transformer 123 within the housing 120. The secondary winding 124 is connected to terminals 125 and 126 on each end of the housing 120 which contact with the spring contacts 110 and 111 previously described. In order to protect the line cord 121 when the external power supply is used, the bottom plate 20 is provided with a slight depression 20' to accept the line cord. The battery compartment is covered by a sub-plate 127 having a groove 128 so that when the sub-plate 127 is positioned in place to close the battery compartment 108 it forms a channel through which the line cord 121 is brought to the rear of the viewer.

The viewer as described above provides a dependable and highly versatile device particularly adaptable for use in stereoscopic viewing of images or transparent slides. It is also clear from the foregoing description that certain elements of the invention are also applicable to devices for displaying single slides for two dimension reproduction.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Apparatus for viewing slides comprising a frame, an inclined member supported by said frame and having an opening therein, a magazine having a plurality of slide holding compartments with each compartment having an opening in the bottom thereof, stationary means for slidably aligning said magazine on said inclined member, a reciprocably mounted slide feeding member movable through the openings in said inclined member and generally parallel with said magazine compartment, said feeding member being movable through a compartment when the latter is centered over the last said member to move a slide outwardly of said magazine and into a viewing position, a plurality of spaced ratchet members on said magazine, a pawl engaging said ratchet members to align said compartments with the feeding member, magazine locking means carried by said feeding member for engaging said ratchet members when a slide is moved into the viewing position to lock said magazine against movement until the slide is returned to its compartment, slide guiding means slidably retained and carried by said feeding member for limited movement relative to said feeding member, said guiding means cooperating with said feeding member to hold each slide in a predetermined position as it is moved from its compartment and for engaging each slide on the return movement of the feeding member for positively effecting its return to its compartment, an actuating member slidably mounted for movement transversely of said feeding member, and means coupling said feeding and actuating members whereby reciprocation of said actuating member will effect reciprocation of said feeding member.

2. Apparatus according to claim 1 including a battery compartment having battery contacts on each end thereof carried by said frame, a connection between one battery contact and said source of illumination, a fixedly positioned switch contact adjoining the other battery contact and connected with said source and conductive means carried by said actuating member for electrically connecting said other battery contact and said fixed switch contact, and a resilient biasing means positioned to engage the actuating member when said fixed switch contact and said conductive means are connected to urge said actuating means in a direction to disconnect said fixed switch contact and said actuating means.

3. The apparatus as claimed in claim 1 in which said spaced ratchet members comprise a plurality of spaced independent elongated teeth members disposed on the opposite sides of said magazine and being parallel to each other and to the slide holding compartment walls, and the spaces between said elongated teeth members being adapted to receive said magazine locking means.

4. The apparatus as claimed in claim 3 in which said elongated teeth members have their top portions inclined downwardly and forwardly of the magazine to facilitate their engagement with said pawl.

5. Apparatus for viewing slides comprising a frame, an inclined member supported by said frame and having an opening therein, a magazine having a plurality of slide holding compartments with each compartment having an opening in the bottom thereof, stationary means for slidably aligning said magazine on said inclined member, a reciprocably mounted slide feeding member movable through the opening in said inclined member and generally parallel with said magazine compartments, said feeding member being movable through a compartment when the compartment is centered over the feeding member to move a slide outwardly of said magazine and into a viewing position, a plurality of spaced ratchet members to align said compartments with the feeding member, magazine locking means carried by said feeding member for engaging said ratchet members and disengaging said pawl when a slide is moved into the viewing position and to lock said magazine against movement until the slide is returned to its compartment, slide guiding means slidably retained and carried by said feeding member for limited movement relative to said feeding member, said guiding means cooperating with said feeding member to hold each slide in a predetermined position as it is moved from its compartment and for engaging each slide on the return movement of the feeding member for positively effecting its return to its compartment, and an actuating member movably mounted on said frame and operatively connected to said feeding member to effect the reciprocation thereof.

References Cited in the file of this patent

UNITED STATES PATENTS

| | | |
|---|---|---|
| 564,466 | Briggs et al. | July 21, 1896 |
| 594,819 | Allen | Nov. 30, 1897 |
| 1,221,091 | Richard | Apr. 3, 1917 |
| 1,274,380 | Brislin | Aug. 6, 1918 |
| 1,492,162 | Delens | Apr. 29, 1924 |
| 2,287,624 | Langenfeld | June 23, 1942 |
| 2,401,506 | Pechkranz | June 4, 1946 |
| 2,699,091 | McLeod et al. | Jan. 11, 1955 |
| 2,705,438 | Peto | Apr. 5, 1955 |
| 2,727,135 | Berg et al. | Dec. 13, 1955 |

FOREIGN PATENTS

| | | |
|---|---|---|
| 641,947 | France | May 1, 1928 |
| 490,731 | Germany | Jan. 31, 1930 |